No Printed Specification Available
7556X
~~7566X~~
Strong & Moody,
Rice Cleaner.
Patented Apr 26. 1833.
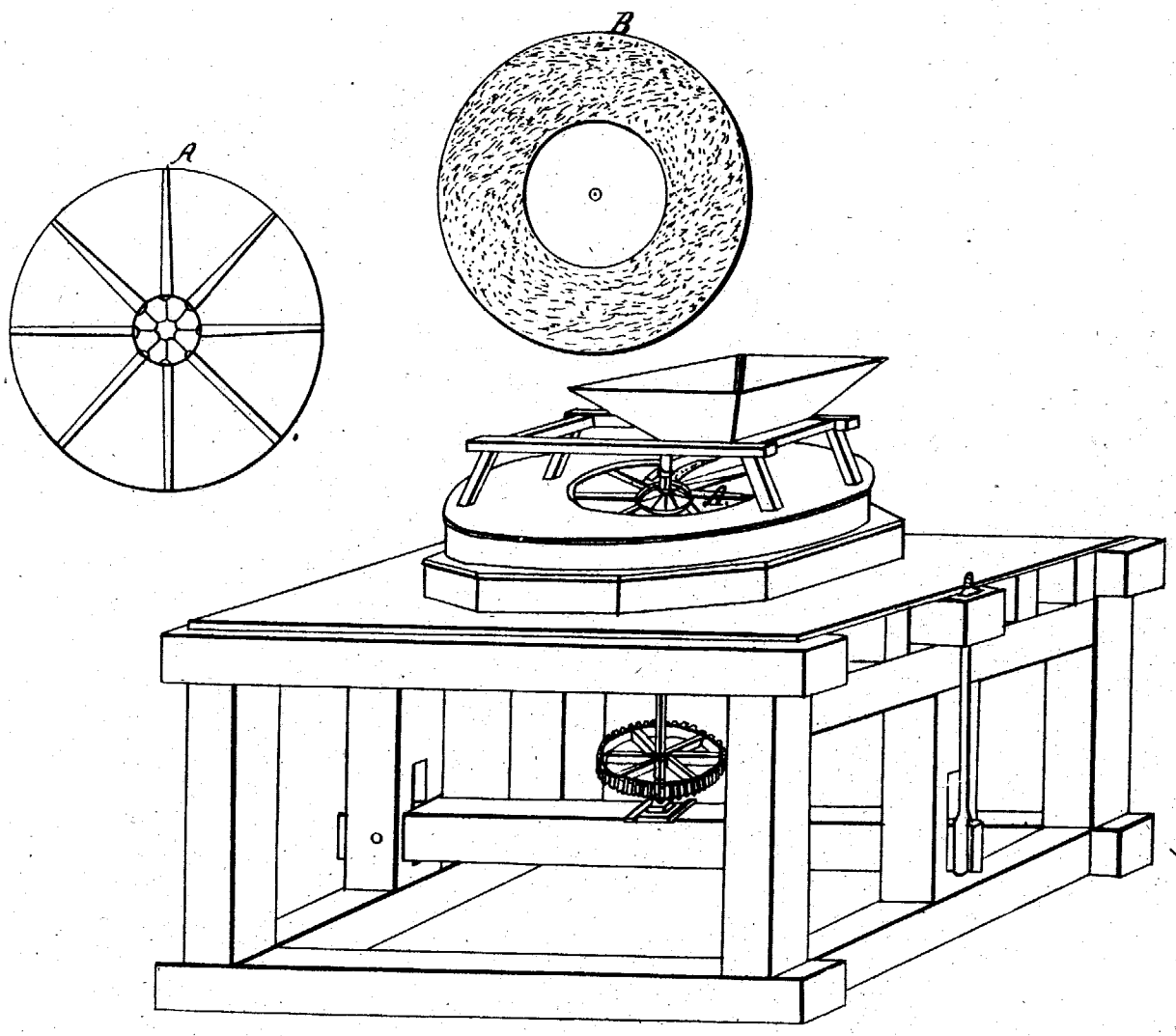

X 7556 Apl 26. 1833 167

Theodore F. Strong and Marcus T. Moody
Letters Patent

The Schedule referred to in these Letters Patent, and making part of the same, containing a description in the words of the said Theodore F. Strong, & Marcus T. Moody themselves of their improvement, in the machine for Hulling, Cleaning & polishing Barley Rice &c.— To all persons to whom these presents shall come. Be it known that WE Theodore F. Strong house carpenter & joiner & Marcus T. Moody Cabinet Maker both of Northampton in the County of Hampshire & Commonwealth of Massachusetts citizens of the United States of America have jointly invented a new and useful improvement in the mode of Hulling Cleaning & polishing of Rice, Barley Broom corn and other small seeds having a hard kernel, and difficult to separate from the hull or husk, and which they have denominated Strong & Moody's second improved Huller Smutter & polisher, and that the following is a full and exact description of the construction and operation of said machine and improvement, as improved and invented by us. This improvement consists of two flat, or Mill stone shaped cylinders of any required diameter placed on a perpendicular shaft similar to the stones in a grist mill. The upper cylinder is made of cast iron, having a sheathing on the under side made
The under cylinder is made of cast iron having a sheathing on the upper side made of wood
of wood. ^ The under side of the upper cylinder, and the upper side of the lower one, are to be studded, clothed, or charged with coarse emery, or other silicious substance, or with smalt or other hard and vitreous composition, firmly united to the surfaces of the cylinders, running against each other by strong glue or other cement. The upper cylinder is moved by an upright shaft to which it is affixed while the lower one is supported on a platform. A rim or border is placed on the outer edge of the lower cylinder and made
of

X 7556 of metal or wood having an opening on one side through
which the seeds are ejected after having passed through the
cylinders. From this pair of cylinders the seeds are passed
through a winnower & screen. & from thence into one or more
pair of cylinders (with intervening winnowers & screens,) shaped
precisely like the first pair above mentioned, but clothed
charged or studded with strong card teeth pins, or points of me-
tallic wire set in leather or any other strong and elastic ...
substance. From the last pair of the last mentioned cylinders,
the seeds are to be passed through a winnower & screen. If a
higher polish is required than is produced by the foregoing
machinery, the seeds may be passed through another pair of
cylinders precisely like the before mentioned, studded, charged
or clothed with very firm and stiff bristles or hair, or with
the skin of the dogfish, having an underlay of india rub
ber or other elastic substance. Or instead of the short or
mill stone shaped cylinders above mentioned, a truncated
cone and corresponding hollow cylinder may be substituted.
clothed, charged, & studded as is before described and speci
fied for the mill stone shaped cylinders. Method of Opera
tion. The seed to be cleansed, hulled or polished is to be
passed from a hopper into the emery cylinders first above
mentioned, from thence into a winnower & screen, then
into the pairs of card teeth clothed cylinders above men-
tioned with their intervening winnowers & screens, from
thence into the polishing cylinders above mentioned, and
from thence into a winnower screen & bolt. The improve
ment claimed by the said Strong & Moody in this ap-
plication as herein specified and described, is the method of
hulling cleaning & polishing or burnishing of rice, barley, Indian
corn and other small seeds having a hard kernel and
difficult to separate from the hull or husk by means of that
flat, or mill stone shaped cylinders or of truncated cones
revolving

X7556 revolving in corresponding hollow cylinders, clothed, charged, or
studded on their corresponding surfaces, as above described,
and specified, with coarse emery, or other hard silicious sub-
stance or with smalt, or other hard and vitreous composi-
tion, firmly united to the surfaces of the cylinders, or of the
cone and cylinder, by strong glue, or other cement and used
in connection, with other cylinders, or cones and cylinders,
clothed, charged, or studded with card teeth, pins or points
of metallic wire — with bristles hair, or skin of the dogfish,
as is herein before described, and specified, and their claim
on this present invention is, as an improvement on Strong &
Moody's' Huller Smutter & polisher which was secured to the
present applicant by Letters Patent, from the United
States — dated. August 29th (A.D. 1832 — and also as an improve-
ment on Strong & Moodys improved patent huller smut-
ter & polisher which was secured to the present applicants
by Letters Patent from the United States dated Novem-
ber 17th (A.D. 1832 — In testimony that the above, is
a true specification of our said improvement and
joint invention as above described, we have hereunto
set our hands at Northampton aforesaid, this twenty
eighth day of February, in the year of our Lord one
thousand eight hundred and thirty three —

Witness

Sam'l L. Hinckley
Jno. [illegible] Lyman
Sam'l Welles Jr

Theodore H. Strong
Marcus T. Moody

[illegible]

[880 [illegible]]

Dr [illegible]